(12) United States Patent
Haas et al.

(10) Patent No.: US 7,019,872 B2
(45) Date of Patent: Mar. 28, 2006

(54) COMPACT SCANNER AND SCANNING METHOD

(75) Inventors: William Robert Haas, Fort Collins, CO (US); Kirk Steven Tecu, Greeley, CO (US); Dave Boll, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 131 days.

(21) Appl. No.: 10/177,612

(22) Filed: Jun. 19, 2002

(65) Prior Publication Data

US 2003/0234963 A1    Dec. 25, 2003

(51) Int. Cl.
*H04N 1/04* (2006.01)

(52) U.S. Cl. .................. 358/494; 358/497; 382/315; 382/314

(58) Field of Classification Search ............... 358/400, 358/401, 500, 501, 471, 486, 487, 494, 497, 358/483; 382/312, 314, 315; 250/363.02, 250/596.06, 208, 216; 359/17, 202; 750/205, 750/216
See application file for complete search history.

(56) References Cited

U.S. PATENT DOCUMENTS 4,722,620 A * 2/1988 Igi .................... 400/73

| | | | |
|---|---|---|---|
| 6,204,494 B1 | 3/2001 | Chavez | 250/208.1 |
| 6,252,241 B1 * | 6/2001 | Sarussi | 250/559.4 |
| 6,355,937 B1 * | 3/2002 | Antonelli | 250/556 |
| 2003/0038227 A1 * | 2/2003 | Sesek | |

FOREIGN PATENT DOCUMENTS

| | | | |
|---|---|---|---|
| JP | 10-200664 | * | 7/1998 |
| JP | 200-307811 | | 11/2000 |

OTHER PUBLICATIONS

Search Report Under Section 17, Appl. GB 0313245.3, Claims 1,7, Date: Oct. 22, 2003.

* cited by examiner

*Primary Examiner*—Jerome Grant, II

(57) ABSTRACT

A scanner comprises a transparent platen mounted on a housing, and an object-imaging device within the housing mounted for longitudinal movement relative to the platen and an object supported thereby. The object-imaging device is rotatable about a transverse axis and comprises an aperture for receiving light reflected from the object. The object-imaging device has a travel distance between a home end position and a back end position, the travel distance comprising a central portion and at least one end portion. The scanner further comprises a mechanism operatively associated with the object-imaging device for rotating the device about the transverse axis thereof in response to movement of the device within the at least one end portion of the travel distance, the device being rotated in a direction so that the light-receiving aperture is rotated away from the central portion of the travel distance.

13 Claims, 3 Drawing Sheets

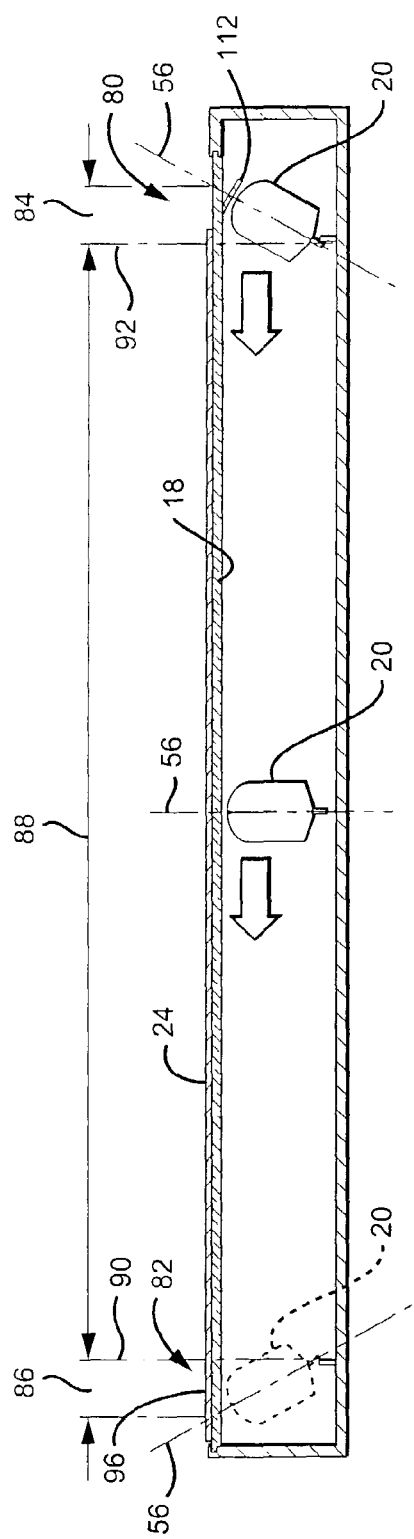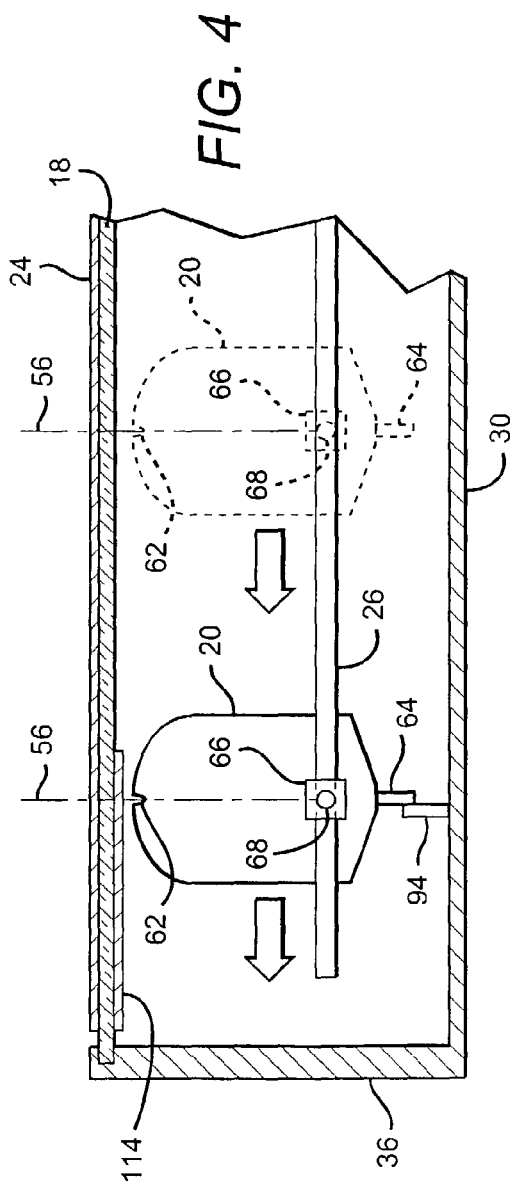

COMPACT SCANNER AND SCANNING METHOD

BACKGROUND OF THE INVENTION

1. Field of the Invention

The present invention relates generally to optical image scanners and more particularly to flatbed scanners.

2. Description of the Related Art

There are currently available flatbed scanners comprising translatable object-imaging devices incorporating contact image sensors for detecting or capturing a scanned image. A contact image sensor is inherently more compact than a charge coupled-device (CCD) which, unlike a contact image sensor, requires image reduction optics. On the other hand, a contact image sensor produces lower quality images and has almost no depth of field, being unable to sharply image objects that are more than a few millimeters above the scanner platen.

Accordingly, it has been recognized that it is desirable to employ CCD technology in a flatbed scanner to gain the image quality and depth of field capabilities of that technology while at the same time reducing the footprint of such a scanner. One way to reduce the scanner footprint is to reduce the length of the document window through which the document is scanned. Reduction of the window length, however, may limit the usefulness of the scanner to scanning relatively small objects such as photographs. To increase the utility of the scanner so that it can handle, for example, letter size and legal size documents, additional equipment, such as an automatic document feeder, may be added to the scanner.

SUMMARY OF THE INVENTION

Thus, there is a need for a compact CCD flatbed scanner, that is, a scanner whose footprint is minimized yet which incorporates a full size object window, that is, a window dimensioned to accommodate, by way of example and not limitation, legal size (8½ inch×14 inch) documents for scanning without the need for additional equipment such as an automatic document feeder.

In accordance with one, specific exemplary embodiment of the present invention, there is provided a scanner comprising a transparent platen mounted on a housing, and an object-imaging device within the housing mounted for longitudinal movement relative to the platen and an object supported thereby. The object-imaging device is rotatable about a transverse axis and comprises an aperture for receiving light reflected from the object. The object-imaging device has a travel distance between a home end position and a back end position, the travel distance comprising a central portion and at least one end portion. The scanner further comprises a mechanism operatively associated with the object-imaging device for rotating the device about the transverse axis thereof in response to movement of the device within the at least one end portion of the travel distance, the device being rotated in a direction so that the light-receiving aperture is rotated away from the central portion of the travel distance.

In accordance with another specific, exemplary embodiment of the invention, there is provided a method of scanning an object placed on the platen of a scanner, the scanner comprising an object-imaging device translatable relative to the platen between a home position and a back end position remote from the home position, the scanner further comprising a calibration means at the home position. The method comprises the steps of scanning the object in a scanning direction with the object-imaging device while translating the object-imaging device from the home position to the back end position, translating the object-imaging device in a return direction toward the home position, rotating the object-imaging device within a home end portion of the travel of the object-imaging device, and calibrating the object-imaging device within the home end portion of the travel thereof.

BRIEF DESCRIPTION OF THE DRAWINGS

The foregoing and other objects, features and advantages of the invention will be evident to those skilled in the art from the detailed description, below, taken together with the accompanying drawings, in which:

FIG. 3 is a side elevation view, in cross-section, of the scanner of FIG. 1 showing the object-imaging device at various positions in its travel;

FIG. 4 is a side elevation view, partly in cross-section, of a portion of the flatbed scanner of FIG. 1 showing the object-imaging device approaching the back end of its longitudinal travel;

DETAILED DESCRIPTION

Figure 1:
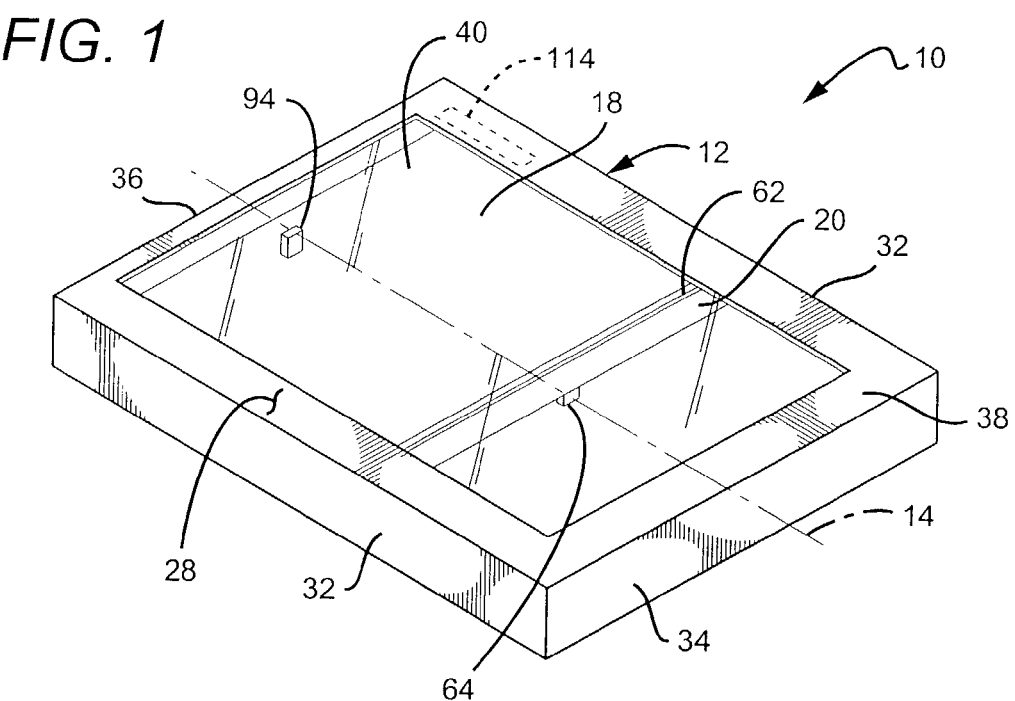
FIG. 1 is a schematic, perspective view of a portion of a flatbed scanner in accordance with a preferred embodiment of the present invention.
Figure 2:
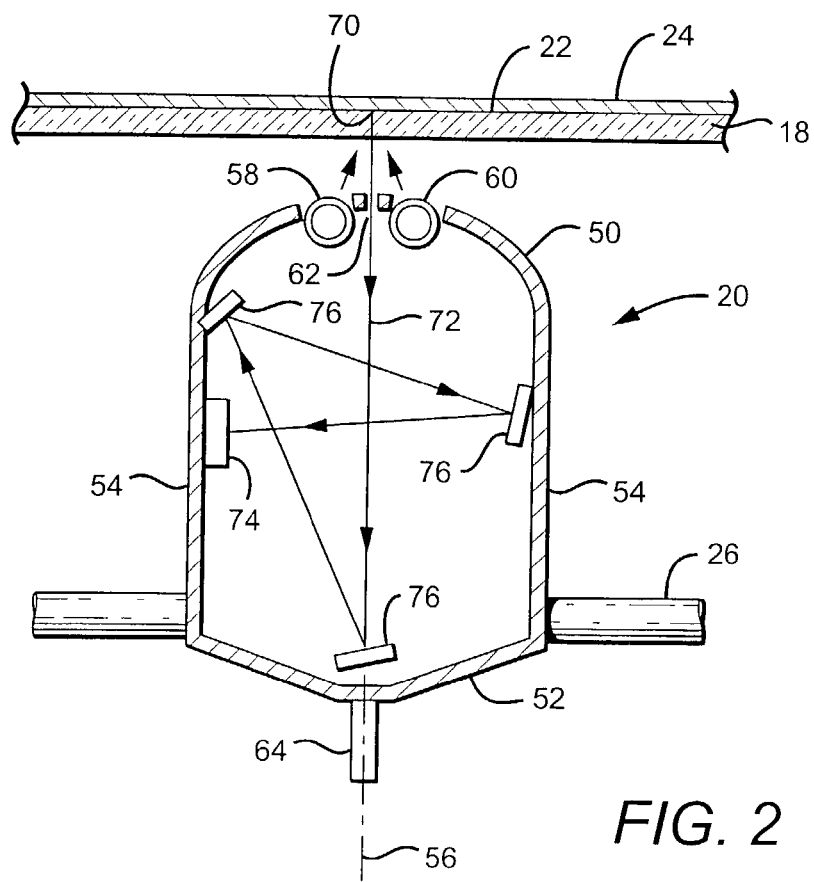
FIG. 2 is a side elevation view, in cross-section, of a movable object-imaging device forming part of the flatbed scanner of FIG. 1, showing in schematic form the optical elements and the light path within the device.

With reference to FIGS. 1 and 2, there is shown in schematic form a flatbed scanner 10 comprising a housing 12 extending along a longitudinal direction 14, a transparent platen 18 supported by the housing 12 and a transversely-extending object-imaging device 20 under the platen. The platen has a planar, object supporting top surface 22 defining the image plane of an object such as a legal size document 24 to be scanned. The object-imaging device 20 is adapted to be driven linearly along a pair of spaced-apart, parallel, longitudinally extending rails 26. For simplicity, the scanner control system, the carriage drive, the hinged scanner housing cover and other conventional features are not shown, it being understood that these features are well-known in the art.

The housing 12 is a generally rectangular structure comprising a top wall 28, a bottom wall 30, side walls 32, and front and back walls 34 and 36, respectively. The housing 12 comprises a front portion 38 adjacent to the front wall 34 adapted to enclose the scanner control system. The top wall 28 of the housing 12 has a generally rectangular opening or frame 40 measuring 8½ inches wide by 14 inches long ("legal" size) in accordance with one exemplary embodiment of the invention. The perimeter of the platen 18 is attached to the top wall 28 of the housing about the rectangular frame 40 in any fashion known in the art. An objective of the present invention is to minimize the length and thus the footprint of the housing 12 while retaining a full-size document window length, for example, 14 inches, as described above.

The object-imaging device 20, in accordance with one, specific, exemplary embodiment thereof, seen best in FIG. 2, comprises an enclosure having an upper convex wall 50, a lower wall 52, and opposed, side walls 54. The device enclosure is symmetrical about a central axis 56 intercepting the upper and lower walls. Disposed adjacent the upper wall 50 of the device enclosure is a light source comprising a pair of parallel, longitudinally spaced apart, transversely-extending tubular lamps 58 and 60. The upper wall 50 of the device enclosure further defines a transverse light-receiving slit or aperture 62 positioned between the tubular lamps 58 and 60. Depending from the bottom wall 52 of the device 20 is a rocker arm 64 preferably centered on the central axis 56 of the device 20 and whose function will be described below. Mounted on each end of the device 20 is a sleeve 66 for receiving one of the rails 26, the device 20 being thereby supported for slidable, longitudinal movement along the rails. The device 20 is pivotably attached to each sleeve 66 so that the device may be rotated or inclined either clockwise or counterclockwise about a transverse pivot axis 68 from an upright position in which the central axis 56 of the device is vertically oriented and perpendicular to the top surface 22 of the platen 18 as shown, for example, in FIG. 2. The device 20 is resiliently biased relative to the sleeves 66 by means of, for example, a flat coil spring (not shown) at each pivot for urging the device about the transverse pivot axis 68 to the vertical, upright orientation of the device.

During reflective scanning, the lower surface of an object such as the legal-size document 24 placed on the top surface 22 of the platen 18 is illuminated along a transverse linear strip or scan line 70 by the light source 58, 60. A beam 72 of light reflected from the illuminated scan line extends along the central axis 56 and passes through the light-receiving aperture 62 to a photodetector array 74 via a system of mirrors 76. Preferably, in accordance with a feature of the present invention, the photodetector array 74 comprises a linear CCD for converting the optical image of the document 24 into a digital electronic image. In the upright orientation of the device 20, the reflected beam 72 is vertical, extending perpendicular to the top, object-supporting surface 22 of the platen.

With reference to FIG. 3, during scanning of an object such as the document 24, the object-imaging device 20 is translated from a home position 80 adjacent the front portion 38 of the scanner housing 12 to a back end position 82 remote from the home position, adjacent the back wall 36 of the housing. The travel distance of the object-imaging device 20 may be divided into three parts: a home end portion 84, a back end portion 86 and a central portion 88 between the home end and back end portions. At the home position 80, the object-imaging device 20 is rotated clockwise (as seen in FIG. 3) so that its central axis 56 is tipped toward the front of the scanner. Conversely, at its back end position 82, the device 20 is inclined so that its central axis 56 is tipped toward the back of the scanner. Within the central portion 88 of its travel, bounded by the vertical lines 90 and 92, the object-imaging device remains upright.

Figure 5:
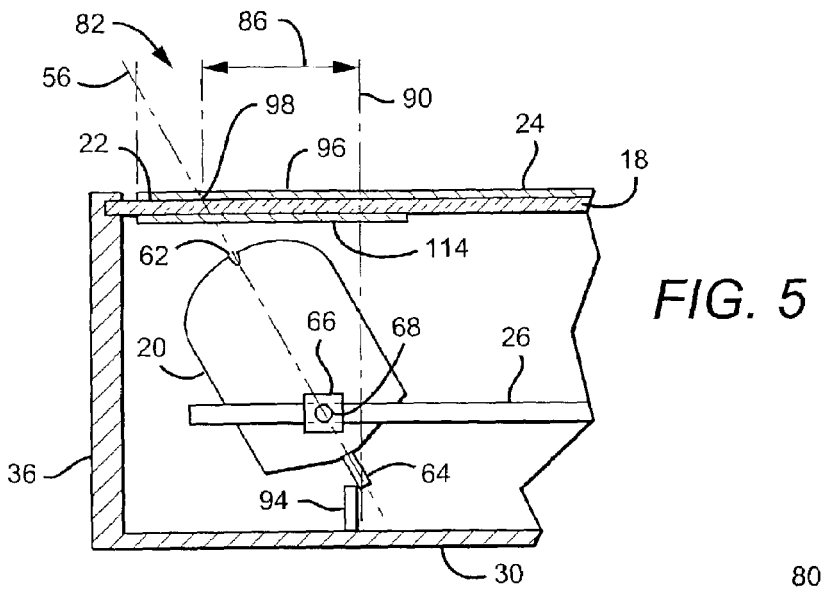
FIG. 5 is the side elevation view of FIG. 4 showing the object-imaging device at the back end of its travel.

With reference to FIG. 4 showing the object-imaging device 20 approaching the back end of a scan, there is provided a mechanism operatively associated with the object-imaging device for rotating the device in response to its movement. Specifically, fixed to the bottom wall 30 of the scanner housing and projecting upwardly therefrom adjacent the boundary line 90 is a first end post 94. The end post 94 is dimensioned and positioned so as to intercept the rocker arm 64 depending from the bottom wall of the device 20 during its travel toward the back end position 82. As seen in FIGS. 4 and 5, when the device 20, traveling to the left, approaches the back end position 82, the rocker arm 64 engages the post 94 and is constrained thereby against further translational movement. Further translation of the object-imaging device 20 within the back end portion 86 of travel thus causes the device 20 to rotate or incline counterclockwise about the transverse pivot axis to a final point in its travel, seen in FIG. 5, at which the device is inclined from the vertical, for example, about 30° (the exact angle being a matter of design choice), so that the aperture 62 faces away from the central portion 88 of travel. It will be evident that after the rocker arm 64 engages the post 94 and during rotation of the device 20, scanning of the document continues for a distance along an end portion 96 of the document 24 to a final scan line 98. It further will be evident that if the device 20 were maintained upright while scanning the document along the back end travel portion 86, the length of the housing 12 would have to be extended (to the left as seen in FIGS. 4 and 5) to accommodate the upright device 20. Thus, by tipping or inclining the device during the final stage of scanning, the housing 12 can be shortened.

As the object-imaging device 20 is moved back toward the front of the housing, the device returns to its upright orientation in the central portion 88 of its travel under the resilient bias of the sleeve-to-carriage pivot.

Figure 6:
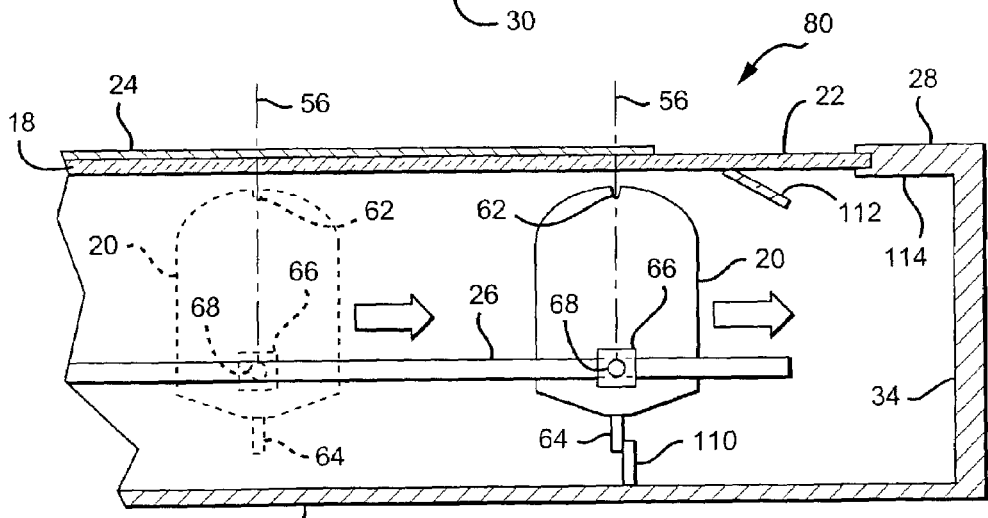
FIG. 6 is a side elevation view, partly in cross-section, of a portion of the flatbed scanner of FIG. 1 showing the object-imaging device approaching its home position.
Figure 7:
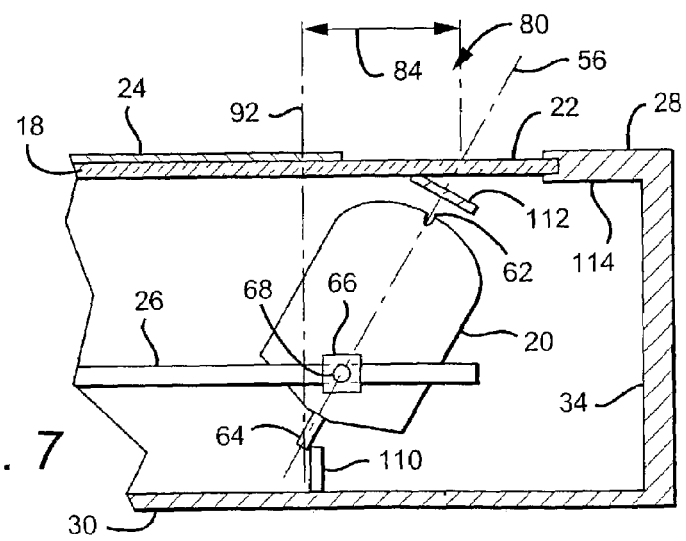
FIG. 7 is the side elevation view of FIG. 6 showing the object-imaging device at its home position.

A similar action takes place at the home end of the scanner housing, as shown in FIGS. 6 and 7. Thus, as seen in FIG. 6, as the object-imaging device 20 is moved toward the home position 80, that is, toward the right as seen in FIG. 6, the depending rocker arm 64 eventually engages a second mechanism for rotating the device 20, which mechanism comprises a second post 110 affixed to the bottom wall 30 of the housing adjacent the boundary 92. Further translation of the device 20 toward the home position, that is, toward the right, thus causes the device to rotate clockwise about the transverse pivot axis 68 to an orientation at which the device 20 is forwardly inclined, for example, about 30° (FIG. 7) (the exact angle being a matter of design choice) again with the aperture 62 rotated away from the central travel portion 88. In the example under consideration, at the end of the rotation of the device 20 within the home end portion 84 of travel, the device 20 is calibrated by imaging a surface 112 of known reflectance. The surface 112 is inclined so as to be perpendicular to the axis 56 of the device 20. By tipping the device 20 at the home end of the housing, that end of the housing may also be shortened for the reasons already stated. If rotation of the device is implemented within both end portions of travel, the overall length of the scanner housing is reduced in one embodiment by about 2 to 3 inches from that of a conventional scanner housing. It will be apparent, however, that the scanner may be designed so that rotation of the device 20 takes place only within one end portion of its travel.

In summary, the object-imaging device 20 starts at the home position rotated forwardly so as to image the surface 112 for purposes of calibration. As the device 20 moves toward the back end, it will rotate upwardly and at the point 92 its central axis 56 will point straight up and begin the scan of the document 24 in its upright position. When the device 20 arrives at the position 90, it will rotate, for example, about 30° (the exact angle being a matter of design choice), to capture the image of the last inch or so of the document along its end portion 96.

In the case in which rotation of the object-imaging device 20 is implemented at the back end of the housing, because the length of the reflected beam increases as the device rotates, the intensity of the reflected light decreases accordingly. The progressive illumination decrease resulting from rotation of the device 20 at the back end of the scanner may be corrected analytically by integrating the light intensity. Another way to make this correction is to provide a white balance strip 114 to the underside of the top wall 28 adjacent to the back end of the scanner housing. (See FIGS. 1, 4 and 5.) Utilizing the variation of the intensity of the beam reflected from the white balance strip 114 as a reference, the scanner firmware varies the energization of the light source 58, 60 as needed to maintain the illumination intensity constant throughout the rotation.

It will also be apparent that the longitudinally extending dimension of the pixels in a scan line will change during rotation of the device within the back end portion of its travel. Compensation for such distortion can be provided during construction of the digitized scan image in accordance with techniques well-known in the art. Also, because the total length of the light path, from the light source to the CCD, will increase, the image may lose focus. The decline in image quality, particularly if text is involved, would not be sufficient in most cases to require correction. A correction could be implemented, however, by decreasing the length of the optical path between the light source and the CCD in response to rotation of the object-imaging device.

What is claimed is:

1. A scanner comprising:
a transparent platen mounted on a housing;
an object-imaging device within the housing mounted for longitudinal movement relative to the platen and an object supported thereby, the object-imaging device being rotatable about a transverse axis and comprising an aperture for receiving light reflected from said object, said device having a travel distance between a home end position and a back end position, the travel distance comprising a central portion and at least one end portion;
a mechanism operatively associated with the object-imaging device for rotating the device about the transverse axis in response to movement of the device within said at least one end portion of the travel distance, the device being rotated in a direction so that the light-receiving aperture is rotated away from the central portion of the travel distance;
within the at least one end portion of the travel distance of the object-imaging device, the aperture therein is oriented to receive light from an end portion of the object; and
a white balance surface for correcting for variations in the intensity of the reflected light within the at least one end portion of the travel distance of the object-imaging device during rotation thereof.

2. A scanner comprising:
a transparent platen mounted on a housing;
an object-imaging device within the housing mounted for longitudinal movement relative to the platen and an object supported thereby, the object-imaging device being rotatable about a transverse axis and comprising an aperture for receiving light reflected from said object, said device having a travel distance between a home end position and a back end position, the travel distance comprising a central portion and at least one end portion;
a mechanism operatively associated with the object-imaging device for rotating the device about the transverse axis in response to movement of the device within said at least one end portion of the travel distance, the device being rotated in a direction so that the light-receiving aperture is rotated away from the central portion of the travel distance; and
within the at least one end portion of the travel distance of the object-imaging device, the aperture therein is oriented to receive reflected light from a calibration surface.

3. A method of scanning an object placed on the platen of a scanner, the scanner comprising an object-imaging device translatable relative to the platen between a home position and a back end position remote from the home position, the scanner further comprising a calibration means at the home position, the method comprising the steps of:
scanning the object in a scanning direction with the object-imaging device while translating the object-imaging device from the home position to the back end position;
translating the object-imaging device in a return direction toward the home position;
rotating the object-imaging device within a home end portion of the travel of the object-imaging device; and
calibrating the object-imaging device within the home end portion of the travel thereof.

4. The method of claim 3 in which the object scanning step further comprises the step of:
rotating the object-imaging device within a back end portion of the travel of the object-imaging device adjacent the back end position in a direction so as to continue scanning the object in the scanning direction.

5. The method of claim 4 further comprising the step of:
correcting for variations in the reflected light from the object during rotation of the object-imaging device within the back end portion of said travel.

6. A method of scanning an object placed on the platen of a scanner, the scanner comprising an object-imaging device translatable relative to the platen between a home position and a back end position remote from the home position, the method comprising the steps of:
scanning the object in a scanning direction with the object-imaging device while translating the object-imaging device from the home position to the back end position; and
rotating the object-imaging device within a back end portion of the travel of the object-imaging device adjacent the back end position in a direction so as to continue the scanning of the object in the scanning direction.

7. The method of claim 6 comprising the step of:
returning the object-imaging device to the home position.

8. The method of claim 7 comprising the step of:
calibrating the object-imaging device at the home position.

9. The method of claim 8 in which:
the step of calibrating the object-imaging device is performed by scanning a surface having a known reflectance.

10. The method of claim 9 in which:
the calibrating step is carried out during rotation of the object-imaging device within a home end portion of the travel of the object-imaging device.

11. The method of claim 10 further comprising the step of:
rotating the object-imaging device during the calibrating step in a direction opposite the direction of rotation of the first mentioned rotating step.

12. The method of claim 6 in which:
the step of rotating the object-imaging device within a back end portion of the travel of the object-imaging device begins after completion of the translating step.

13. The method of claim 6 further comprising the step of:
correcting for variations in the reflected light from the object during rotation of the object-imaging device within the back end portion of said travel.

* * * * *